(12) United States Patent
Drehmel et al.

(10) Patent No.: US 7,275,125 B2
(45) Date of Patent: Sep. 25, 2007

(54) PIPELINE BIT HANDLING CIRCUIT AND METHOD FOR A BUS BRIDGE

(75) Inventors: Robert Allen Drehmel, Goodhue, MN (US); Clarence Rosser Ogilvie, Huntington, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/064,744

(22) Filed: Feb. 24, 2005

(65) Prior Publication Data

US 2006/0190667 A1 Aug. 24, 2006

(51) Int. Cl.
*G06F 13/36* (2006.01)
*G06F 7/38* (2006.01)
*G06F 13/00* (2006.01)

(52) U.S. Cl. .................. 710/315; 710/306; 710/314; 708/233; 711/146

(58) Field of Classification Search ................ 710/315, 710/306, 314; 708/233; 711/146
See application file for complete search history.

(56) References Cited

U.S. PATENT DOCUMENTS

| | | | |
|---|---|---|---|
| 4,281,381 A | 7/1981 | Ahuja et al. | |
| 5,038,346 A | 8/1991 | Courtois | |
| 5,546,546 A | 8/1996 | Bell et al. | |
| 5,581,705 A | 12/1996 | Passint et al. | |
| 5,740,409 A | 4/1998 | Deering | |
| 5,778,096 A | 7/1998 | Stearns | |
| 5,835,739 A | 11/1998 | Bell et al. | |
| 5,835,741 A | 11/1998 | Elkhoury et al. | |
| 5,841,973 A | 11/1998 | Kessler et al. | |
| 5,893,151 A | 4/1999 | Merchant | |
| 6,021,451 A | 2/2000 | Bell et al. | |
| 6,055,608 A | 4/2000 | Arimilli et al. | |
| 6,065,087 A | * 5/2000 | Keaveny et al. | ............ 710/315 |
| 6,124,868 A | 9/2000 | Asaro et al. | |
| 6,138,218 A | 10/2000 | Arimilli et al. | |
| 6,247,086 B1 | 6/2001 | Allingham | |
| 6,252,849 B1 | 6/2001 | Rom et al. | |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

*Primary Examiner*—Mark H. Rinehart
*Assistant Examiner*—Jeremy S Cerullo
(74) *Attorney, Agent, or Firm*—Martin & Associates, LLC; Derek P. Martin

(57) ABSTRACT

A circuit and method to provide pipeline bit handling across a bus bridge between two different buses. In a preferred embodiment, the pipeline bit handling circuit provides rule enforcement for a P-bit address modifier across a bus bridge between two different buses with different rules for the P-bit address modifier. In a bus domain where pipeline transactions are allowed if the P-Bit is asserted and are not allowed if the P-Bit is not asserted, embodiments herein allow a master bus device to ensure that all bus devices will see a P=0 command with a defined minimum spacing to any other P=0 command. The required separation for P=0 commands is maintained within the bus bridge. In the preferred embodiments, the separation between P=0 commands is maintained by immediately retrying P=0 commands rather than spacing snoop requests.

18 Claims, 5 Drawing Sheets

U.S. PATENT DOCUMENTS

| | | |
|---|---|---|
| 6,363,438 B1 | 3/2002 | Williams et al. |
| 6,405,276 B1 | 6/2002 | Chen et al. |
| 6,449,699 B2 | 9/2002 | Franke et al. |
| 6,477,610 B1 | 11/2002 | Willenborg |
| 6,502,154 B1 | 12/2002 | Meredith et al. |
| 6,502,157 B1 | 12/2002 | Batchelor et al. |
| 6,556,952 B1 | 4/2003 | Magro |
| 6,571,308 B1 | 5/2003 | Reiss et al. |
| 6,581,116 B1 * | 6/2003 | Arimilli et al. ............. 710/110 |
| 6,668,309 B2 | 12/2003 | Bachand et al. |
| 6,694,383 B2 | 2/2004 | Nguyen et al. |
| 6,725,296 B2 | 4/2004 | Craddock et al. |
| 6,751,695 B1 | 6/2004 | Jirgal |
| 6,799,317 B1 | 9/2004 | Heywood et al. |
| 6,801,207 B1 | 10/2004 | Tischler et al. |
| 6,801,208 B2 | 10/2004 | Keshava et al. |
| 6,816,161 B2 | 11/2004 | Lavelle et al. |
| 6,820,143 B2 | 11/2004 | Day et al. |
| 6,820,174 B2 | 11/2004 | Vanderwiel |
| 6,848,032 B2 | 1/2005 | Benkual et al. |
| 6,886,048 B2 | 4/2005 | Richard et al. |
| 6,889,284 B1 | 5/2005 | Nizar et al. |
| 6,978,319 B1 | 12/2005 | Rostoker et al. |
| 6,985,988 B1 | 1/2006 | Nsame |
| 6,993,632 B2 | 1/2006 | Kruckemyer et al. |
| 7,054,987 B1 | 5/2006 | Reed et al. |
| 7,124,232 B2 | 10/2006 | Takeda et al. |
| 7,143,246 B2 | 11/2006 | Johns |
| 2004/0117592 A1 | 6/2004 | Day et al. |
| 2004/0156199 A1 | 8/2004 | Rivas et al. |
| 2004/0162946 A1 | 8/2004 | Day et al. |
| 2004/0168011 A1 | 8/2004 | Hemming |
| 2004/0263519 A1 | 12/2004 | Andrews et al. |
| 2006/0069788 A1 | 3/2006 | Blackmore et al. |

* cited by examiner

PIPELINE BIT HANDLING CIRCUIT AND METHOD FOR A BUS BRIDGE

RELATED APPLICATIONS

The present application is related to the following applications, which are incorporated herein by reference:

"Method and System for Ordering Requests at a Bus Interface", Ogilvie et al., Ser. No. 11/064,728, co-filed herewith;

"Data Ordering Translation Between Linear and Interleaved Domains at a Bus Interface", Horton et al., Ser. No. 11/064,569, co-filed herewith;

"Method and System for Controlling Forwarding or Terminating of a Request at a Bus Interface Based on Buffer Availability", Ogilvie et al., Ser. No. 11/064,570, co-filed herewith;

"Computer System Bus Bridge", Biran et al., Ser. No. 11/064,568, co-filed herewith;

"Apparatus and Method for Transaction Tag Mapping Between Bus Domains", Kautzman et al., Ser. No. 11/064,567, co-filed herewith;

"Transaction Flow Control Mechanism for a Bus Bridge", Ogilvie et al., Ser. No. 11/064,722, co-filed herewith; and "Computer System Architecture", Biran et al., Ser. No. 11/064,745, co-filed herewith.

BACKGROUND OF THE INVENTION

1. Technical Field

This invention generally relates to computer memory systems and memory coherency, and more specifically relates to a circuit and method for handling a pipeline bit across a bus bridge.

2. Background Art

Access response from computer main memory is typically much slower than processor cycle times. Efficient mechanisms to bridge this gap between memory and processor cycle times are central to achieving high performance in computer systems. The conventional approach to bridging the gap between memory access time and processor cycle time has been to introduce a high-speed memory buffer, commonly known as a cache, between the processor and main memory. The main purpose of a cache memory is to provide fast access time while reducing bus and memory traffic. Some systems include two or more intermediate cache levels.

One of the problems that arise in computer systems that include a plurality of caching agents and a shared data cache memory hierarchy is the problem of cache coherency. Cache coherency refers to the problem wherein—due to the use of multiple, or multi-level, cache memories—data may be stored in more than one location in memory. By way of example, if a microprocessor is the only device in a computer system which operates on data stored in memory, and the cache is situated between the CPU and memory, there is little risk in the CPU using stale data. However, if other agents in the system share storage locations in the memory hierarchy, this creates an opportunity for copies of data to be inconsistent, or for other agents to read stale copies.

Cache coherency is especially problematic in computer systems which employ multiple processors as well as other caching agents (e.g., input/output (I/O) devices). A program running on multiple processors requires that copies of the same data be located in several cache memories. Thus, the overall performance of the computer system depends upon the ability to share data in a coherent manner.

Some processor bus specifications define a pipeline bit (P-bit) that assists the processor in maintaining data coherency. In this type of bus domain, the system may pipeline transactions if the P-Bit is asserted (P=1). If the P-Bit is not asserted (P=0), the system must not pipeline other P=0 transactions. Thus, using this P-Bit, a master can ensure that all bus devices will see a P=0 command with a defined minimum spacing to any other P=0 command. In this type of bus system, there is typically an address concentrator that issues a snoop request after receiving a first P=0 command to determine if any other cache is holding data corresponding to the P=0 command. The address concentrator would also hold any subsequent P=0 commands until the first command is completed. Thus the address concentrator typically spaces snoop requests to maintain separation between P=0 commands In a system where there is a bus bridge between a first bus that uses a P=0 for a pipeline bit, and a second bus that uses a P-bit for a priority bit or does not use a pipeline bit, there is a need for a way to accommodate for the difference in the P=0 bit commands.

DISCLOSURE OF INVENTION

Preferred embodiments provide a circuit and method to provide pipeline bit handling across a bus bridge between two different buses. In a preferred embodiment, the pipeline bit handling circuit provides rule enforcement for a P-bit address modifier across a bus bridge between two different buses with different rules for the P-bit address modifier. In a bus domain where pipeline transactions are allowed if the P-Bit is asserted (P=1) and are not allowed if the P-Bit is not asserted (P=0), embodiments herein allow a master bus device to ensure that all bus devices will see a P=0 command with a defined minimum spacing to any other P=0 command to ensure data coherency. The required separation for P=0 commands is maintained within the bus bridge rather than by an address concentrator. In the preferred embodiments the separation between P=0 commands is maintained by immediately retrying P=0 commands rather than spacing snoop requests.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

Figure 1:
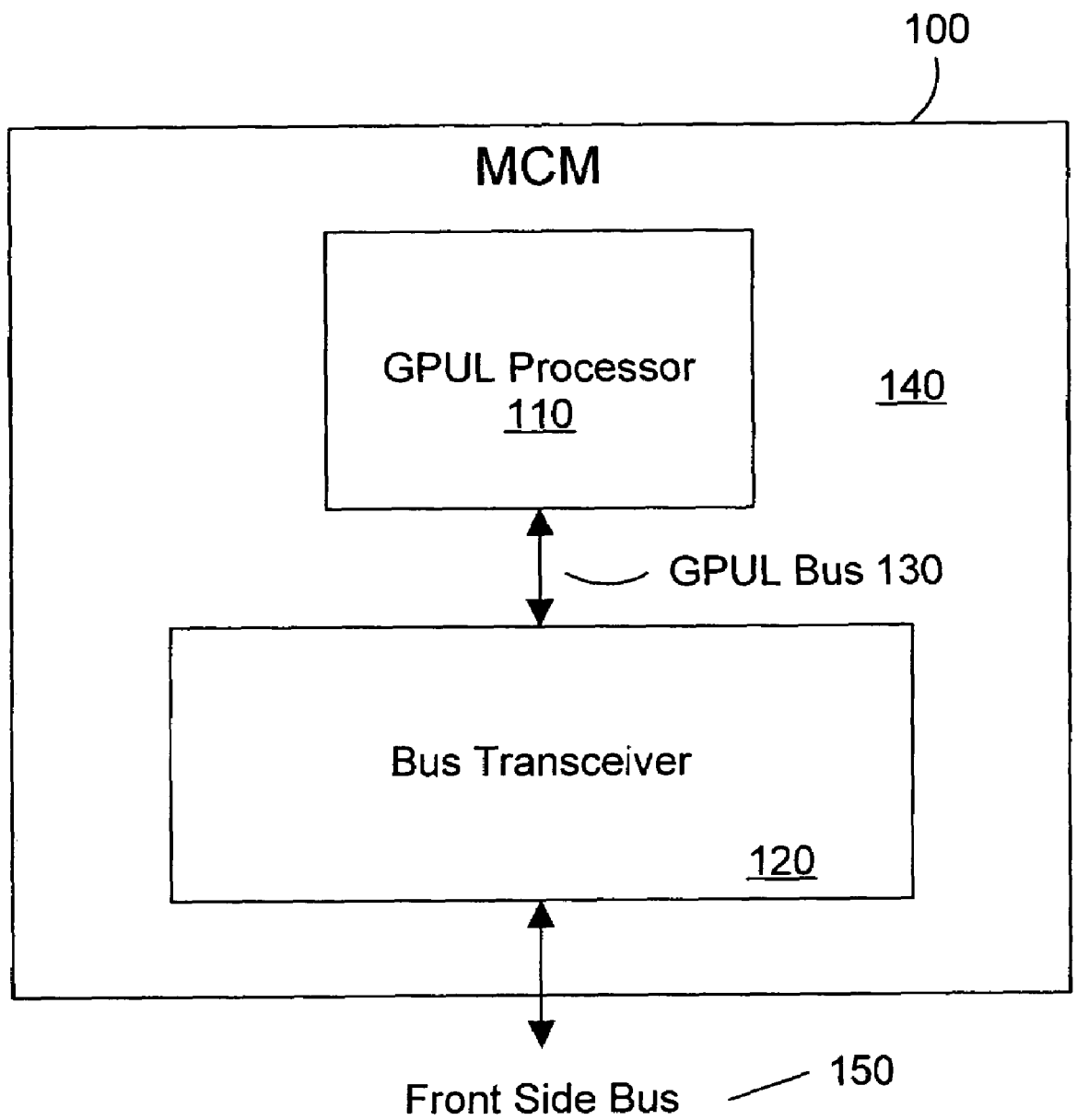
FIG. 1 is a block diagram of a computer system in accordance with the preferred embodiments.

The present invention provides a method and apparatus for separation of P=0 commands across a bus bridge between two high speed computer buses. The preferred embodiment is a bus bridge between a GPUL bus for a GPUL PowerPC microprocessor from International Business Machines Corporation (IBM) and an output high speed interface (MPI bus). Published information is available about the GPUL processor 110 and the GPUL bus 130 from various sources including IBM's website. This section provides an overview of these two buses.

API Bus

The API bus is sometimes referred to as the PowerPC 970FX interface bus, GPUL Bus or the PI bus (in the PowerPC's specifications). This document primarily uses the term API bus, but the other terms are essentially interchangeable. The API bus consists of a set of unidirectional, point-to-point bus segments for maximum data transfer rates. No bus-level arbitration is required. An Address/Data (AD) bus segment, a Transfer Handshake (TH) bus segment, and a Snoop Response (SR) bus segment exist in each direction, outbound and inbound. The terms packet, beat, master, and slave are defined in the following paragraphs.

Data is transferred across a bus in beats from master to slave. A beat is a timing event relative to the rising or falling edge of the clock signal. Nominally there are two beats per clock cycle (one for the rising edge and one for the falling edge).

A packet is the fundamental protocol data unit for the API bus. A non-null packet consists of an even number of data elements that are sequentially transferred across a source-synchronous bus at the rate of one element per bus beat. The number of bits in each data element equals the width of the bus. Packets are used for sending commands, reading and writing data, maintaining distributed cache coherency, and transfer-protocol handshaking.

A sender or source of packets for a bus segment is called a master and a receiver or recipient is called a slave. For example, on an outbound processor bus segment, a north bridge is the slave and the processor is the master. On an inbound processor bus segment, the north bridge is the master and the processor is the slave. Four basic packet types are defined: null packets, command packets, data packets, and transfer-handshake packets. Non-null packet lengths are always an even number of beats. Null packets are sent across the address/data bus. For the null packet all bits are zero. Null packets are ignored by slave devices. Command packets are sent across the address/data bus. These are further partitioned into three types: read/command packets, write-command packets, and coherency-control packets. Data packets are also sent across the address/data bus. These are further partitioned into two types: read-data packets and write-data packets. A write-data packet immediately follows a write-command packet. A read-data packet is sent in response to a read-command packet or a cache-coherency snoop operation. A data read header contains the address of the command, the command type, and transfer details.

Transfer-handshake packets are sent across the transfer handshake bus. This packet is issued to confirm receipt and indicate the condition of the received command packet or data packet. Condition encoding includes Acknowledge, Retry, Parity Error, or Null/Idle. A transfer-handshake packet is two beats in length.

The API bus includes an Address/Data (AD) bus segment, a Transfer Handshake (TH) bus segment, and a Snoop Response (SR) bus segment in each direction, outbound and inbound. The Transfer Handshake bus sends transfer-handshake packets which confirm command or data packets were received on the Address/Data bus. The Transfer Handshake bus consists of one 1-bit outbound bus segment (THO) and one 1-bit inbound bus segment (THI). Every device issuing a command packet, data packet, or reflected command packet to the Address/Data bus receives a transfer-handshake packet via the Transfer Handshake bus some fixed number of beats after issuing the command or data packet. Each Transfer Handshake bus segment sends transfer packets for command and data packets transferred in the opposite direction. That is, the outbound Transfer Handshake bus sends acknowledge packets for the command and data packets received on the inbound AD bus. There is no dependency or relationship between packets on the outbound Address/Data bus and the outbound Transfer Handshake bus.

A transfer-handshake packet might result in a command packet being reissued to the bus due to a command queue data buffer full condition. A transaction remains active until it has passed all response windows. For write transactions this includes the last beat of the data payload. Since commands might be retried for queue or buffer full conditions, transactions that must be ordered cannot be simultaneously in the active state. A write transaction issued by the processor can be retried. There are two transfer-handshake packets issued by the slave for a write transaction. The first packet is for the write-command packet and the second for the write-data packet. For read transactions, the processor will not retry inbound (memory to processor) transfers. Reflected commands, i.e., snoop requests (inbound from North Bridge to processor), cannot be retried. This is necessary to ensure a fixed snoop window is maintained.

The Snoop Response bus supports global snooping activities to maintain cache coherency. This bus is used by a processor to respond to a reflected command packet received on the API bus. The Snoop Response bus consists of one 2-bit outbound bus segment (SRO) and one 2-bit inbound bus segment (SRI). The bus segments can detect single bit errors.

API Bus Summary

The address portion of the bus is 42 bits wide and is transferred in 2 beats. Data is 64 bits wide and transferred across a bus in a maximum of 4 bytes/beats from master to slave or slave to master. The API bus has a unified command phase and data phase for bus transactions. A single tag is used to identify an entire bus transaction for both command phase and data phase. Tags are unique when bus transactions are outstanding. Each command tenure contains a target slave address, the master's requestor unit id, the transfer type, the transfer size, an address modifier, and transaction tag for the entire transaction. The size of the single transaction tag is m-1 bits, with respect to the MPI bus command destination tag.

The API bus supports the modified intervention address snoop response protocol which effectively allows a master device to request and obtain a cache line of 128 bytes from another master device. Bus transactions can have three phases: a command phase, snoop phase and a data phase. Command only transactions are possible, which include a command phase and snoop phase. Cache line coherency is supported by reflecting commands to other master and slave devices attached to the bus coupled with a bus snooping protocol in the snoop phase. The API bus supports the modified intervention address snoop response protocol, which allows a master device to request a cache line from another master device.

The API bus specification defines four basic packet types: null packets, command packets, and data packets. The command packet consists of a memory address, command type, command size, and a command tag. The command packet is identified on the Address/Data bus by the detection of the packet start signal and a packet-type encoding for a command packet. Several bits of a command packet are defined as address modifier bits. These bits further describe the type of command packet. One address modifier bit is the P-bit, or pipeline bit that is further described below.

The MPI Bus and Comparison to the API Bus

The MPI bus is a microprocessor bus of equal or higher performance than the API bus. The MPI bus also supports attachment of multiple master and slave devices. The address bus is 42 bits wide and is transferred in 1 beat. Data is transferred across a bus in a maximum 16 bytes/beats from master to slave or slave to master. The data bus is 128 bits wide. Each complete bus transaction is split into unique tagged command transaction phases and data transaction phases, which is different from unified transaction on the API bus.

There are a total of three tags on the MPI bus that are used to mark complete bus transactions. Two are used in the command phase the third is used in the data phase. Each command phase uses a destination tag and response acknowledge tag. The command destination tag (grttag) indicates the unique command for which the response is destined. The size of this command destination tag is m bits, and is one bit larger that the command transaction tag on the API bus. The response acknowledge tag (gratag) indicates the unique unit which responds to the issued command. The data transaction tag (dtag) indicates the unique data transfer. Tags are unique when bus transactions are outstanding. Since the data phase has its own unique dtag, the data phase of one transaction may finish out of order with respect to the data phase of another transaction.

Each command contains a target slave address, the requestor's unit id, transfer type, transfer size, an address modifier, and the command destination tag. The command phase is composed of a request tenure, reflected command tenure, and then a global snoop response tenure. The request tenure issues the command, with a destination tag. The reflected command tenure, reflects the command on the bus and then returns a master slave snoop response (gresp) to the MPI.

The global snoop response tenure provides a combined response from all units on the bus via the CBI, with the original destination tag and the response acknowledge tag (gratag). The data transaction phase is composed of the data request tenure and the data transfer tenure. The data transaction phase occurs independently after the command phase is completed if data transfer is required. In the data request tenure, a master requests to transfer data and it waits until it gets a grant from the target slave device. The data transfer tenure begins after the grant is received. The master provides the data transaction tag, and the data transfers while the data valid signal is active.

The MPI bus contains a credit mechanism to indicate availability of available transaction buffer resources. This credit mechanism is used by MPI masters to pace their issue of new command transactions.

DESCRIPTION OF THE PREFERRED EMBODIMENTS

FIG. 1 illustrates a block diagram of a computer processor system 100 according to a preferred embodiment. The computer processor system 100 includes a Giga-Processor Ultralite (GPUL) 110 for the central processing unit. The GPUL is connected to an ASIC bus transceiver 120 with a GPUL bus 130. The illustrated embodiment shows a single GPUL processor 110 but it is understood that multiple processors could be connected to the GPUL bus 130. The GPUL 110 and the bus transceiver 120 are interconnected on a Multi-Chip Module (MCM) 140. In other embodiments (not shown) the processor(s) and the transceiver are integrated on a single chip. Communication with the computer system 100 is provided over a Front Side Bus (FSB) 150.

In the preferred embodiment, the GPUL 110 is a prior art processor core from International Business Machines Corporation (IBM) called the IBM PowerPC 970FX RISC microprocessor. The GPUL 110 provides high performance processing by manipulating data in 64-bit chunks and accelerating compute-intensive workloads like multimedia and graphics through specialized circuitry known as a single instruction multiple data (SIMD) unit. The GPUL 110 processor incorporates a GPUL bus 130 for a communications link. The GPUL bus 130 is also sometimes referred to as the API bus. In the illustrated embodiment, the GPUL bus 130 is connected to a bus transceiver 120.

Figure 2:
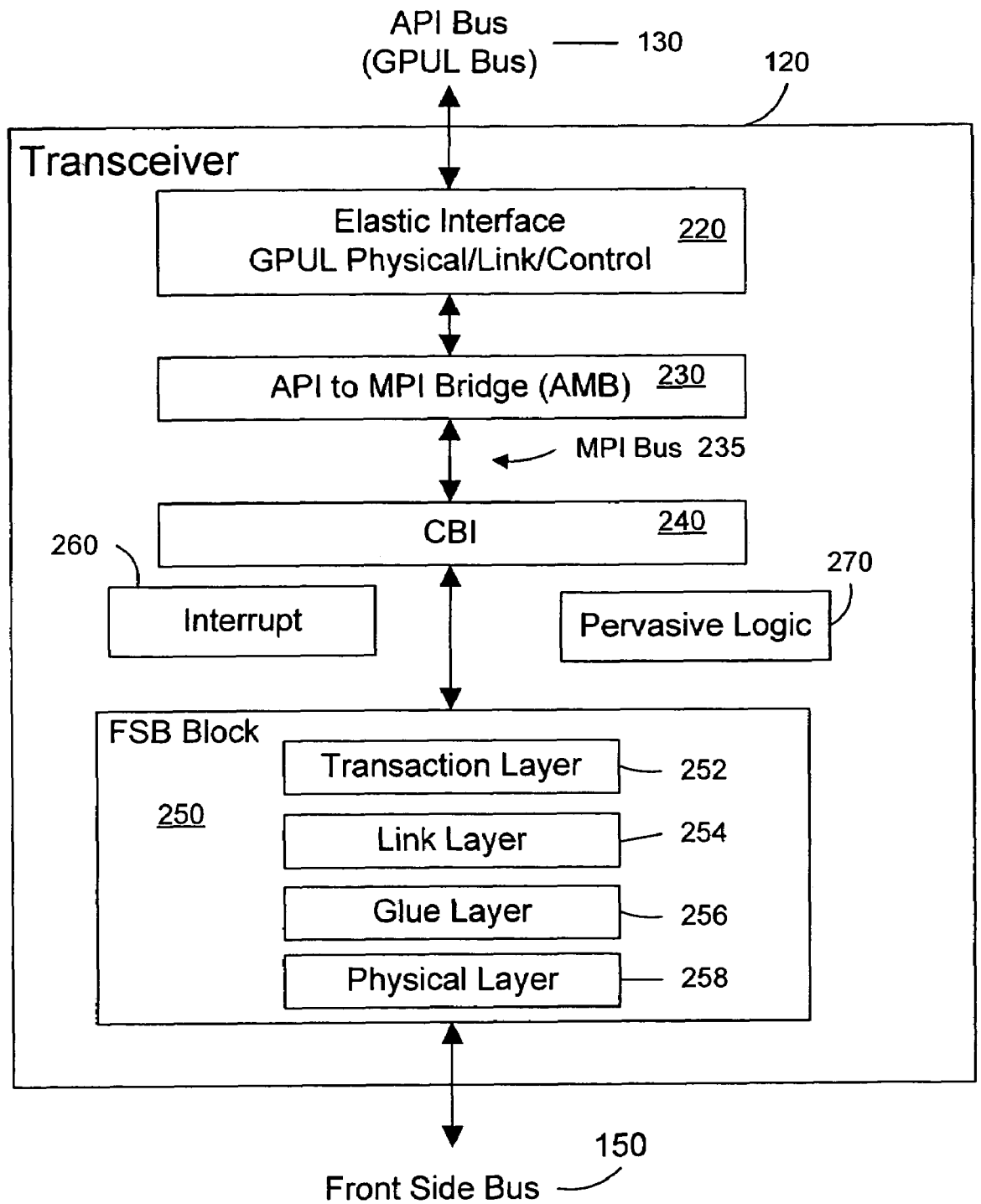
FIG. 2 is a block diagram of the bus transceiver shown in the computer system of FIG. 1.

FIG. 2 illustrates a block diagram of the bus transceiver 120 according to preferred embodiments. The bus transceiver 120 includes an elastic interface 220 that is the physical/link/control layer for the transceiver connection to the GPUL processor over the API bus 130. The elastic interface is connected to the API to MPI Bridge (AMB) 230. The AMB 230 is a bus bridge that provides protocol conversion between the MPI bus 235 and the API bus 130 protocols. The MPI bus 235 connects the AMB 230 to the Common Bus Interface (CBI) block 240. The CBI connects to the Front Side Bus (FSB) block 250. The FSB block provides I/O connections for the bus transceiver 120 to the Front Side Bus (FSB) 150. The FSB block 250 includes a transaction layer 252, a link layer 254, a glue layer 256 and a physical layer 258. The bus transceiver 120 also includes an interrupt block 260, and a pervasive logic block 270. Each of these blocks in bus transceiver 120 is described further in the co-filed applications referenced above.

Figure 3:
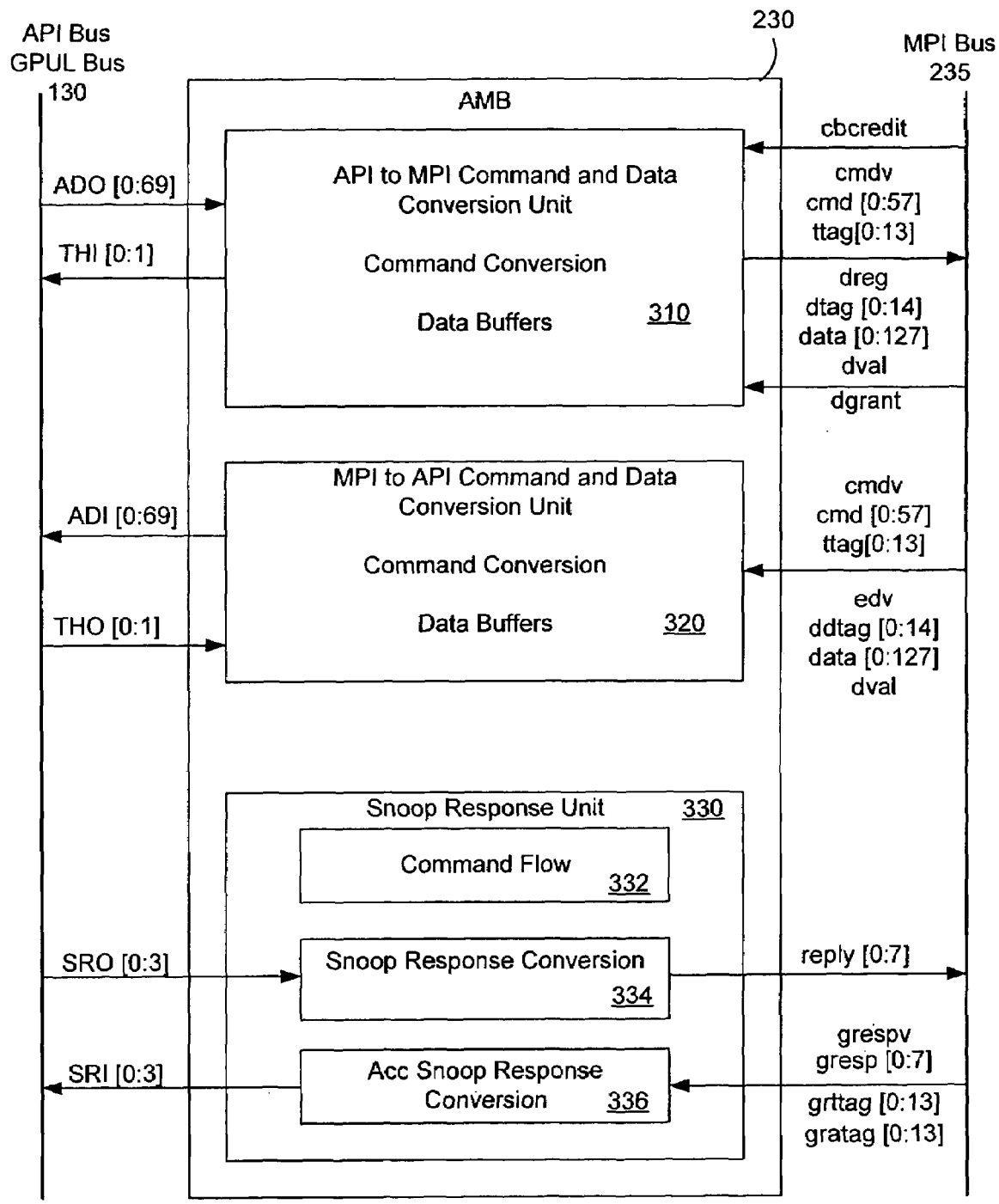
FIG. 3 is a block diagram of the API to MPI Bridge (AMB) introduced in FIG. 2 in accordance with the preferred embodiments.

FIG. 3 further illustrates the AMB 230. The AMB 230 is the conversion logic between the API bus 130 and MPI bus 235. The AMB 230 transfers commands, data, and coherency snoop transactions back and forth between the elastic interface 220 and the CBI 240 in FIG. 2. The AMB is made up of three units: the API to MPI command and data conversion unit 310, the MPI to API command and data conversion unit 320 and the snoop response unit 330. The primary function of each unit is to convert the appropriate commands, data, and snoop responses from the API bus to the MPI bus and from the MPI bus to the API bus.

P-Bit Commands

The API and MPI bus specifications define different meanings for the P-Bit address modifier. In the API domain the P-bit is the Pipeline bit. In the MPI domain there is a P-bit that is defined as the priority bit. Embodiments herein provide a method and apparatus in a bus bridge to handle this difference in bus protocols.

Figure 4:
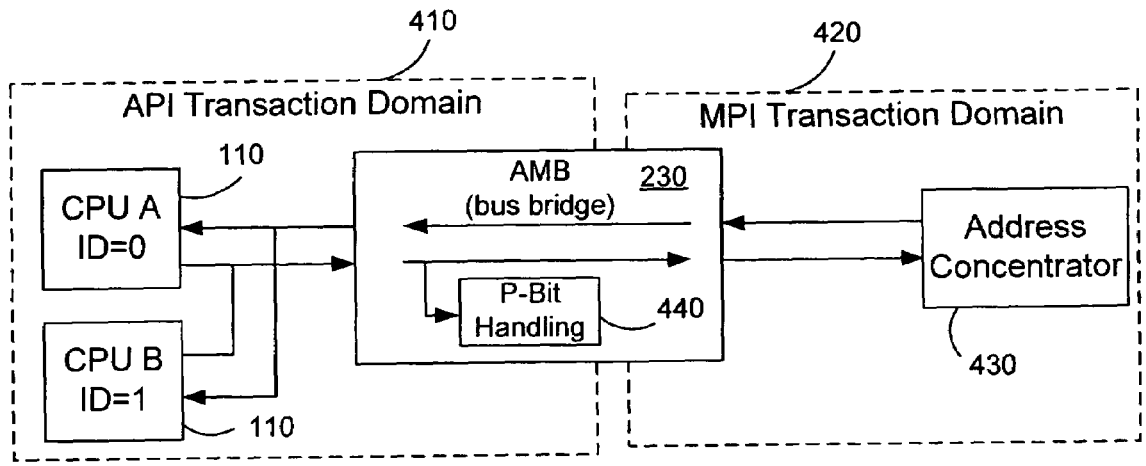
FIG. 4 is a block diagram showing the AMB and the API and MPI domains to illustrate the P-Bit command handling in accordance with the preferred embodiments.

FIG. 4 shows a block diagram according to a preferred embodiment. The API transaction domain 410 includes one or more processors 110 as described above with reference to FIG. 1. The processors 110 communicate with the AMB 230 (also shown in FIG. 2) which is located in bus transceiver 120 (shown in FIG. 1). The MPI transaction domain 420 includes the address concentrator 430 which resides in the CBI 240 (shown in FIG. 2). The AMB 230 includes a P-Bit handling circuit 440 described further below with reference to FIG. 5.

In the API domain 410, the system may pipeline transactions if the P-Bit is asserted (P=1). If the P-Bit is not asserted (P=0), the system must not pipeline other P=0 transactions. Thus, using P-Bit commands, a master can ensure that all bus devices will see a P=0 command with a defined minimum spacing to any other P=0 command. In the MPI domain 420 the P-Bit is the priority bit and provides hints to other logical units about the priority of a transaction. In the illustrated embodiment, the address concentrator 430, which is in the MPI domain 420, interprets P to mean priority and does not maintain command separation between P=0 commands. In preferred embodiments, the required separation for P=0 commands is maintained within the AMB 230 rather than by the address concentrator 430. Also in preferred embodiments, the separation between P=0 commands is maintained by immediately retrying P=0 commands rather than spacing snoop requests.

Figure 5:
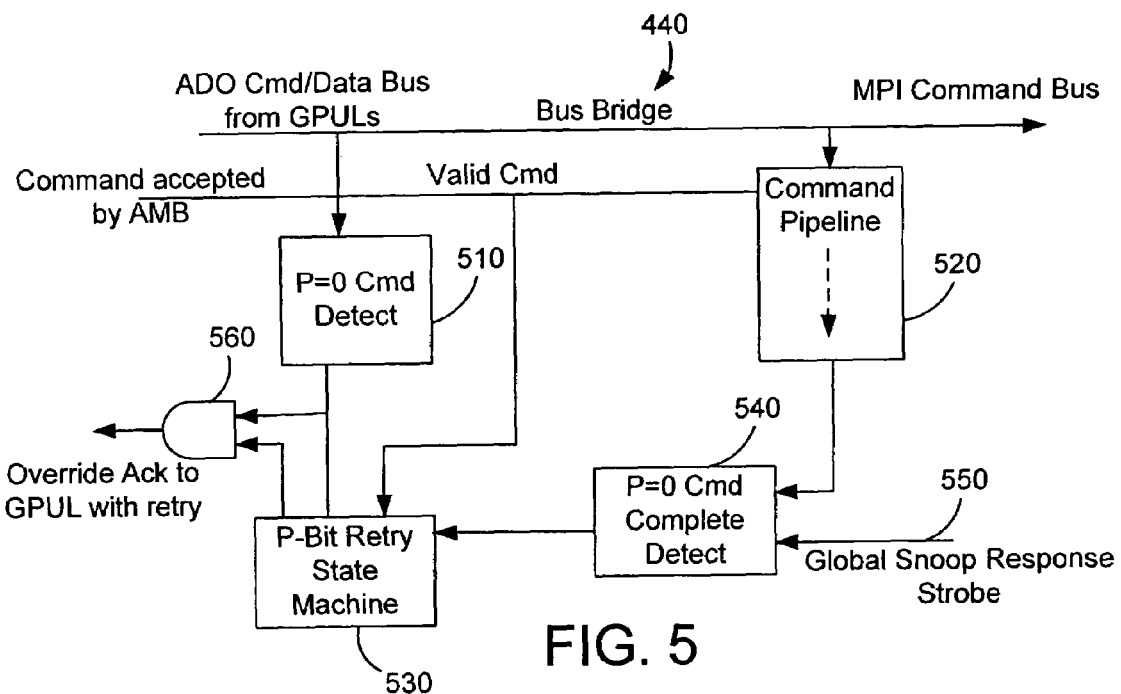
FIG. 5 is a block diagram of the P-Bit command detection and retry in accordance with the preferred embodiments.

FIG. 5 illustrates the P-Bit handling circuitry 440 for detecting P=0 commands. The AMB (API/MPI bus bridge) 230 maintains separation between a first P=0 command and subsequent P=0 commands by immediately retrying any subsequent P=0 commands issued before the completion of the first P=0 command. Only the first P=0 command will be passed through the AMB 230 to the address concentrator 430 (FIG. 4). When the first P=0 commands completes, the AMB 230 will get ready for the next P=0 command. In this way, the AMB 230 maintains the required minimum separation between P=0 commands. Thus, the address concentrator 430 (in the CBI) will never see a subsequent P=0 command until the initial P=0 command is complete since the AMB is retrying all subsequent P=0 commands and will never pass a second P=0 command request to the CBI.

The P-Bit handling circuitry 440 includes a P=0 command detect circuit 510. The P=0 command detect circuit 510 detects when the pipeline bit is de-asserted (P=0) in a command from the API transaction domain 410 (FIG. 4). A command pipeline 520 stores commands that are waiting to be processed. A pipeline bit retry state machine 530 determines when to assert command retry on the first bus. A pipeline command complete detect circuit 540 signals the pipeline bit retry circuit that a pipeline command is complete when a global snoop response 550 is received for the respective command in the pipeline 520. A retry gate 560 indicates to the APB bus using the API bus handshake signals to retry the P=0 command. The retry gate 560 is asserted when the command detect circuit 510 detects a pipeline bit in an incoming command, and the pipeline bit retry state machine 530 indicates it is in the retry state.

Figure 6:
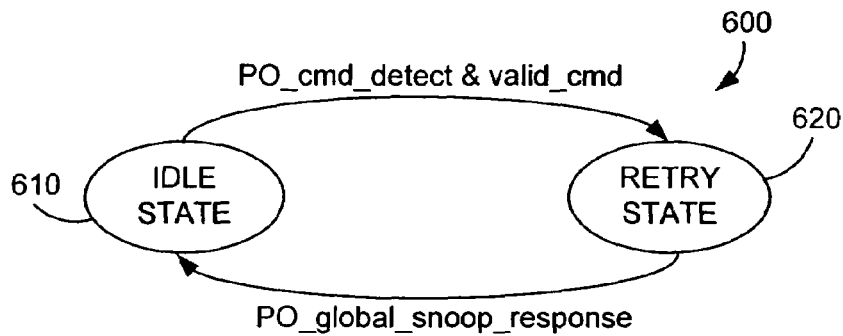
FIG. 6 is a state machine flow diagram in accordance with the preferred embodiments.

FIG. 6 shows a flow diagram of the P-bit retry state machine 600. The P-Bit retry state machine 600 looks for valid P=0 command requests from the API masters CPU A or CPU B (FIG. 4). If there is a valid P=0 command, and the state machine is in the idle state 610, and the command has been acknowledged, indicating a valid command, the state machine will transition to the retry state 620. The retry state 620 forces all subsequent P=0 commands to be retried until the original P=0 command is complete. The address concentrator responds to the P=0 command with a global snoop response to indicate the P=0 Command is complete. At this point, the state machine is set to the idle state 610 and the AMB can accept the next P=0 command. In the preferred embodiments, the value of the P-Bit is always passed unaltered to the other domain.

Figure 7:
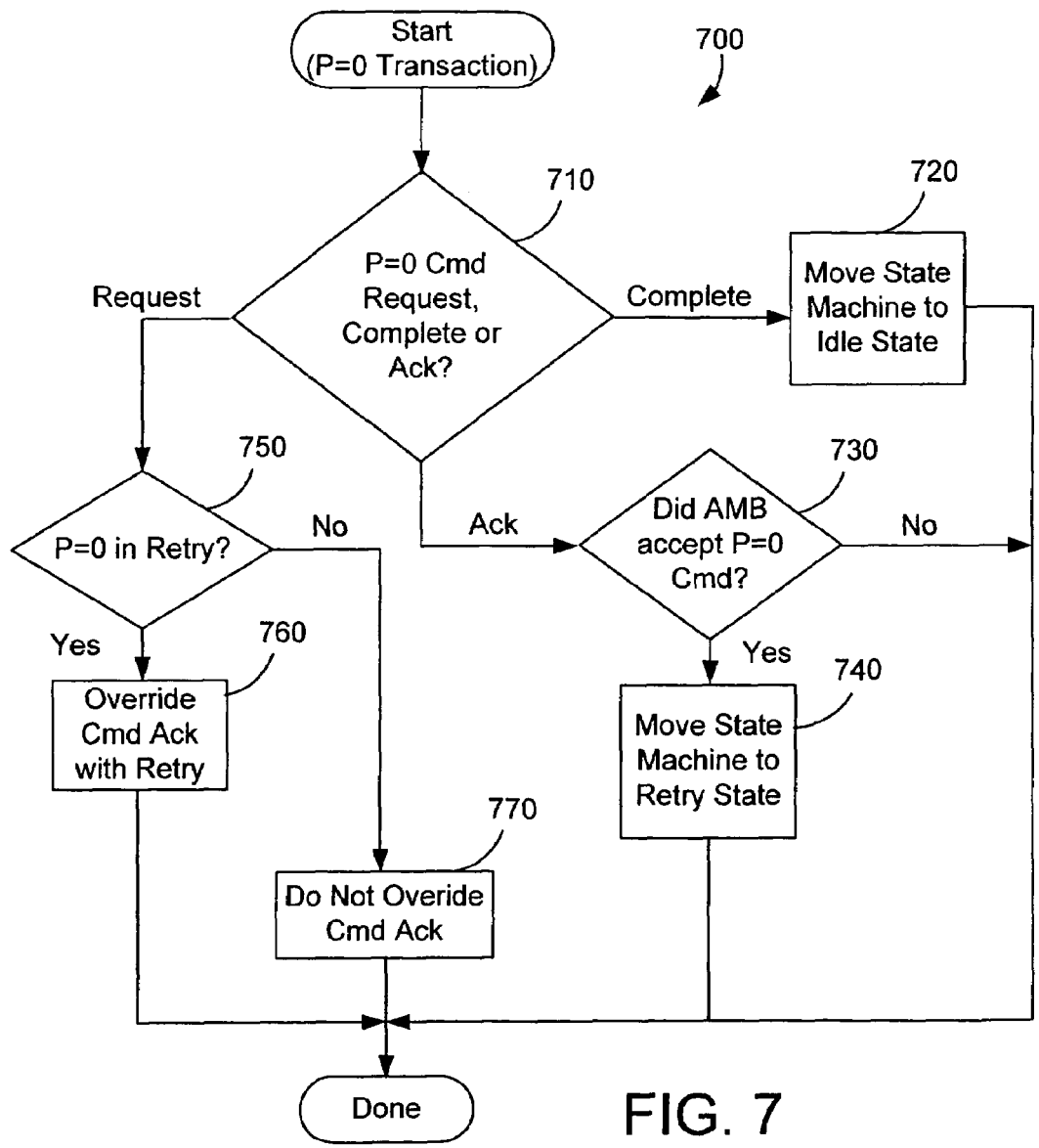
FIG. 7 is a flow diagram of a method in accordance with the preferred embodiments.

FIG. 7 shows a method 700 according to embodiments of the present invention. The method begins each time a P=0 transaction occurs. First the method 700 determines the type of P=0 transaction 710. If the P=0 transaction is a command complete (step 710=complete), then the state machine is moved to the idle state 720 and the method 700 is done until the next P=0 transaction occurs. If the P=0 transaction is an acknowledge (step 710=ack), then a check is made to determine if the AMB accepted the P=0 command 730, and if so (step 730=yes) the state machine is moved to the retry state 740. If the AMB did not accept the command (step 730=no) then the method is done with this transaction. If the P=0 transaction is a request (step 710=request), then a check is made to determine if the retry state machine is in the retry state 750, and if so (step 750 =yes) then the P-Bit handling circuit overrides the command acknowledge with a command retry 760. If the retry state machine is not in the retry state (step 750=no) then the P-Bit handling circuit does not override the command acknowledge with a command retry 770.

The embodiments described herein provide important improvements over the prior art. The preferred embodiments will provide the computer industry with an improved method to accommodate the difference in the P=0 bit commands in a system where with a bus bridge between a first bus that uses a P=0 for a pipeline bit, and a second bus that does not use a pipeline bit.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A pipeline bit handling circuit in a computer bus bridge between a first bus and a second bus comprising:
  a pipeline bit command detector that detects a command containing an asserted pipeline bit on the first bus;
  a pipeline bit retry circuit that determines when to assert command retry on the first bus and asserts command retry on the first bus when a pipeline bit command is detected on the first bus;
  a pipeline command complete detect circuit to signal the pipeline bit retry circuit that the pipeline bit command from the first bus is complete on the second bus to cause the pipeline bit retry circuit to stop asserting command retry on the first bus; and
  wherein the pipeline command complete detect circuit determines the pipeline bit command is complete when a global snoop response corresponding to the pipeline bit command is received.

2. The pipeline bit handling circuit of claim 1 further comprising a command pipeline for storing commands from the first bus to the second bus.

3. The pipeline bit handling circuit of claim 1 wherein the first bus is an API bus that defines a p-bit as the pipeline bit.

4. The pipeline bit handling circuit of claim 1 wherein the second bus is a MPI bus that defines a p-bit as a priority bit.

5. The pipeline bit handling circuit of claim 1 wherein the pipeline bit retry circuit has an idle state and a retry state, the retry circuit moves from the idle state to the retry state when a valid P=0 command is detected, and moves from the retry state to the idle state when the P=0 command is complete.

6. The pipeline bit handling circuit of claim 5 wherein all P=0 commands received during the retry state are retried.

7. A computer system with a pipeline bit handling circuit in a bus bridge between a first bus and an second bus comprising:
  a pipeline bit command detector that detects a command containing an asserted pipeline bit on the first bus of the computer system;
  a pipeline bit retry circuit that determines when to assert command retry on the first bus and asserts command retry on the first bus when a pipeline bit command is detected on the first bus;
  a pipeline command complete detect circuit to signal the pipeline bit retry circuit that the pipeline bit command from the first bus is complete on the second bus to cause the pipeline bit retry circuit to stop asserting command retry on the first bus; and
  wherein the pipeline command complete detect circuit determines the pipeline bit command is complete when a global snoop response corresponding to the pipeline bit command is received.

8. The computer system of claim 7 further comprising a command pipeline for storing commands from the first bus to the second bus.

9. The computer system of claim 7 wherein the first bus is an API bus that defines a p-bit as the pipeline bit.

10. The computer system of claim 7 wherein the second bus is a MPI bus that defines a p-bit as a priority bit.

11. The computer system of claim 7 wherein the pipeline bit retry circuit has an idle state and a retry state, the retry circuit moves from the idle state to the retry state when a valid P=0 command is detected, and moves from the retry state to the idle state when the P=0 command is complete.

12. The computer system of claim 11 wherein all P=0 commands received during the retry state are retried.

13. A method for assuring data coherency in a computer system with a bus bridge between a first bus and an second bus, the method comprising the steps of:
  detecting in the bus bridge a command containing an asserted pipeline bit on a first bus;
  asserting command retry on the first bus for subsequent pipeline commands; and
  detecting that the pipeline command from the first bus is complete when a global snoop response corresponding to the pipeline bit command is received; and
  causing the pipeline bit retry circuit to stop asserting command retry on the first bus.

14. The method of claim 13 further comprising the step of storing commands from the first bus to the second bus in a command pipeline.

15. The method of claim 13 wherein the first bus is an API bus that defines a p-bit as the pipeline bit.

16. The method of claim 13 wherein the second bus is a MPI bus that defines a p-bit as a priority bit.

17. The method of claim 13 wherein the pipeline bit retry circuit has an idle state and a retry state, and the pipeline bit retry circuit moves from the idle state to the retry state when a valid P=0 command is detected, and moves from the retry state to the idle state when the P=0 command is complete.

18. The method of claim 17 wherein all P=0 commands received during the retry state are retried.

* * * * *